(12) United States Patent
Mazzocco

(10) Patent No.: US 8,498,894 B2
(45) Date of Patent: Jul. 30, 2013

(54) METHOD AND APPARATUS FOR DISTRIBUTING TICKETS OVER A WIDE AREA NETWORK

(75) Inventor: John Mazzocco, Portland, OR (US)

(73) Assignee: Tenth Caller, Inc., Portland, OR (US)

( * ) Notice: Subject to any disclaimer, the term of this patent is extended or adjusted under 35 U.S.C. 154(b) by 513 days.

(21) Appl. No.: 09/990,101

(22) Filed: Nov. 21, 2001

(65) Prior Publication Data

US 2002/0087407 A1    Jul. 4, 2002

Related U.S. Application Data

(60) Provisional application No. 60/252,983, filed on Nov. 22, 2000.

(51) Int. Cl.
*G06Q 30/00* (2012.01)

(52) U.S. Cl.
USPC .......................................................... 705/14.1

(58) Field of Classification Search
USPC ................................ 705/5, 8, 14, 22, 28, 14.1
See application file for complete search history.

(56) References Cited

U.S. PATENT DOCUMENTS

| | | | | |
|---|---|---|---|---|
| 5,855,369 A | * | 1/1999 | Lieberman | 273/139 |
| 5,893,075 A | * | 4/1999 | Plainfield et al. | 705/14.67 |
| 6,061,660 A | * | 5/2000 | Eggleston et al. | 705/14 |
| 6,363,351 B1 | * | 3/2002 | Moro | 705/5 |
| 6,656,050 B2 | * | 12/2003 | Busch et al. | 463/42 |

* cited by examiner

*Primary Examiner* — Daniel Lastra
(74) *Attorney, Agent, or Firm* — Marger Johnson & McCollom, P.C.

(57) ABSTRACT

When an event undersells, the event promoter contacts a service provider such as Poundhouse either via phone, fax or e-mail, alerting us that they would like to "paper the house," or fill the hall with individuals who might not otherwise go. Poundhouse then e-mails its users that an opportunity to go to a specific event is available and that they need to enter to win tickets. Users follow the link in the e-mail or come to the Web site and enter the contest by typing in their e-mail address and password. At a pre-specified time, the contest is automatically closed and "winners" are notified, via e-mail, that they won tickets to that event. The number of tickets made available to Poundhouse by the event promoter determines the number of winners. A guest list is compiled and faxed and/or e-mailed to the event promoter. Winning individuals each get to bring a single guest.

11 Claims, 5 Drawing Sheets

FIG. 3a  CONTENT ID | DATE | LOCATION | CONTENT

FIG. 3b  USER ID | LOCATION

FIG. 3c  PROFILE ID | USER ID | CONTENT ID

10 DAYS BEFORE CONCERT

1 DAY BEFORE CONCERT

AT CONCERT

METHOD AND APPARATUS FOR DISTRIBUTING TICKETS OVER A WIDE AREA NETWORK

CROSS-REFERENCES TO RELATED APPLICATIONS

This application claims the benefit from U.S. Provisional Patent Application No. 60/252,983 filed Nov. 22, 2000 whose contents are incorporated herein for all purposes.

BACKGROUND OF THE INVENTION

1. Field of the Invention

This invention relates generally to narrow-casting information to users and more particularly to a method and apparatus for distributing perishable entertainment inventory.

2. Description of the Prior Art

It is commonly known that revenue from concert and sporting events not only comes from primary sources such as the ticket sales themselves, but is also derived from ancillary sources such as from concessions, parking, and concert memorabilia. The same is true for such items as movie tickets and lift tickets at ski resorts where the operating costs (to put on the show or per hour charge of operating the ski lifts) is fixed no matter how many people are served. When such events do not sell out, however, not only is the ticket revenue lost forever but revenue that could have been gained through these ancillary sales is lost as well. Such events and ancillary sales are perishable because the opportunity to make those sales are lost once the event occurs.

It has been determined that less than only 15% of music events actually sell out. Concerts that undersell affect everyone involved, from the building owner to the concert promoter to the band to the beverage distributor. In order to make up for some lost revenue, venues often "paper the house," giving away unsold tickets. This is a laborious and slow-moving process. Promoters often spend weeks giving tickets away, calling on friends, family and a small circle of "guaranteed attendees." The process is limited by the manpower assigned to the task, to the number of people the staff has access to and the number of man-hours assigned to the task.

Accordingly, the need remains for an improved method for papering the house.

SUMMARY OF THE INVENTION

It is, therefore, an object of the invention to successfully distribute entertainment inventory without devaluing the face value of the tickets.

Previously, there has never been a universal method for "papering the house". Event promoters depended on corporations or giving tickets to friends. There has never been a person assigned to the task and man-hours were never earmarked for the task. Instead, it was done in a piecemeal, unorganized fashion, and it was always limited by the number and type of contacts the event promoter had.

The present invention provides a completely automated, totally focused process that can bring in more people (and people that already have an interest in the event) in a faster time frame. By doing this, the present invention can increase revenue at the event without hurting the value of the ticket, because it is invisible to the average consumer, because the distribution process conducted per the present invention gives out tickets to all events, from the most popular artists and teams to smaller, undiscovered talents and because the number of tickets being giving away is never disclosed to the user.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIGS. 3A-3C illustrate data structures of the types of information stored within the database shown in FIG. 1.

APPENDIX lists the source code interaction implementing the invention according to a preferred embodiment.

DETAILED DESCRIPTION

Figure 1:
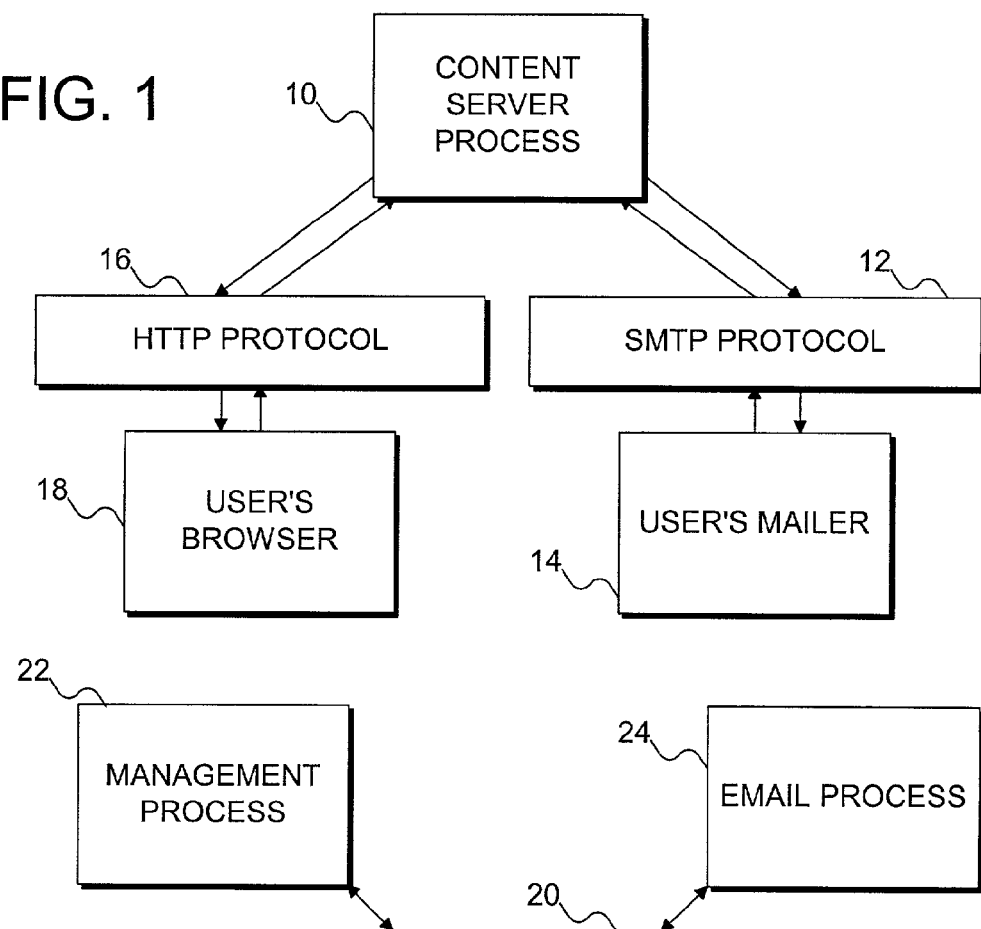
FIG. 1 is a block diagram illustrating an apparatus for providing content information to the user according of the invention.

FIG. 1 shows two ways of providing content information to the user, either through an automated e-mail process via SMTP 12 protocol where the user's e-mail account 14 is notified by the Web site content process server 10, or by the user coming to the Web site and finding the information via HTTP protocol 16 in the user's browser 18.

Figure 2:
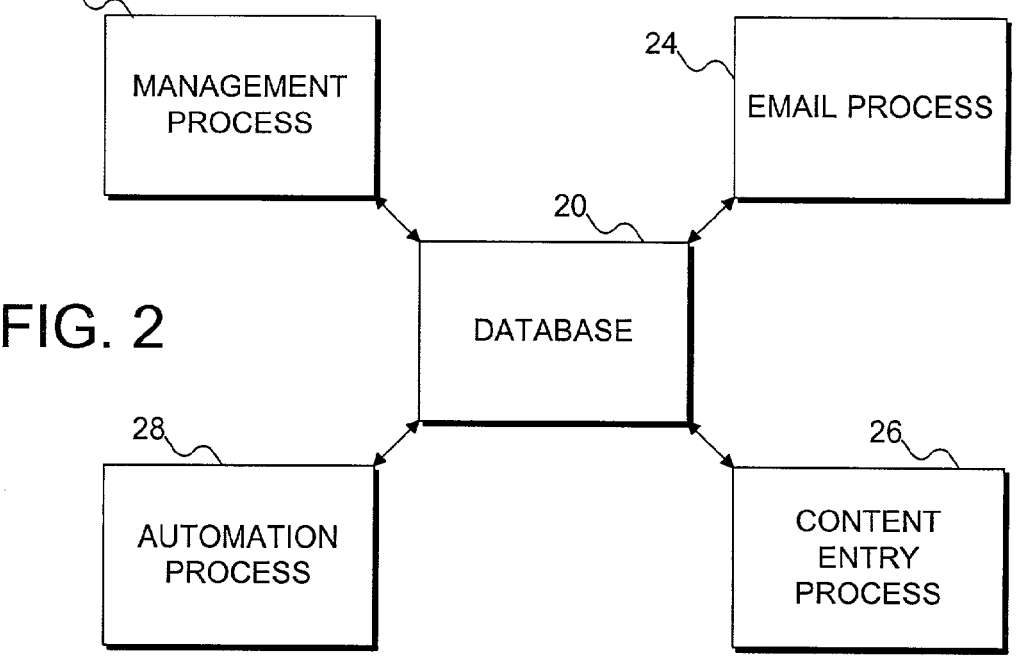
FIG. 2 is a block diagram illustrating the operational modules provided in the present invention for implementing the invention.

FIG. 2 shows the relationship between the database 20 and the four steps involved in the process. The Management Process 22 involves the collection and entering of content information. The E-mail Process 24 involves e-mailing targeted users of the event. Users are targeted in two ways, either by geography or by prior interest being expressed in a prior event by the same artist/entertainer or events of a similar nature. Determinations of whether an event is similar to another is generally made by the content provider (promoter) or the content manager. Associations are then made within the database to capture users who might be most interested in attending the event. The entry process 26 involves how the user comes to the Web site and enters to win tickets to the event; users enter their e-mail address and password. The automation process 28 details how the winner is chosen (based on the total number of entrants and the number of tickets available to an operator utilizing the invention. The process is completely automated and random). Winners are notified via e-mail that they have won tickets to that event.

FIGS. 3a-3c illustrate data structures of the types of information stored within the database shown in FIG. 1. FIG. 3a illustrates the event data and includes the event (content) ID, the date on which the event occurs, the location and related content. FIG. 3b stores the location of the user so that they can be matched with events in their area. FIG. 3c contains the user profile which includes user selected interests and selection histories. Each of these data structures are matched to yield a rich database of persons most likely to take advantage of the perishable entertainment inventory.

Figure 4A:
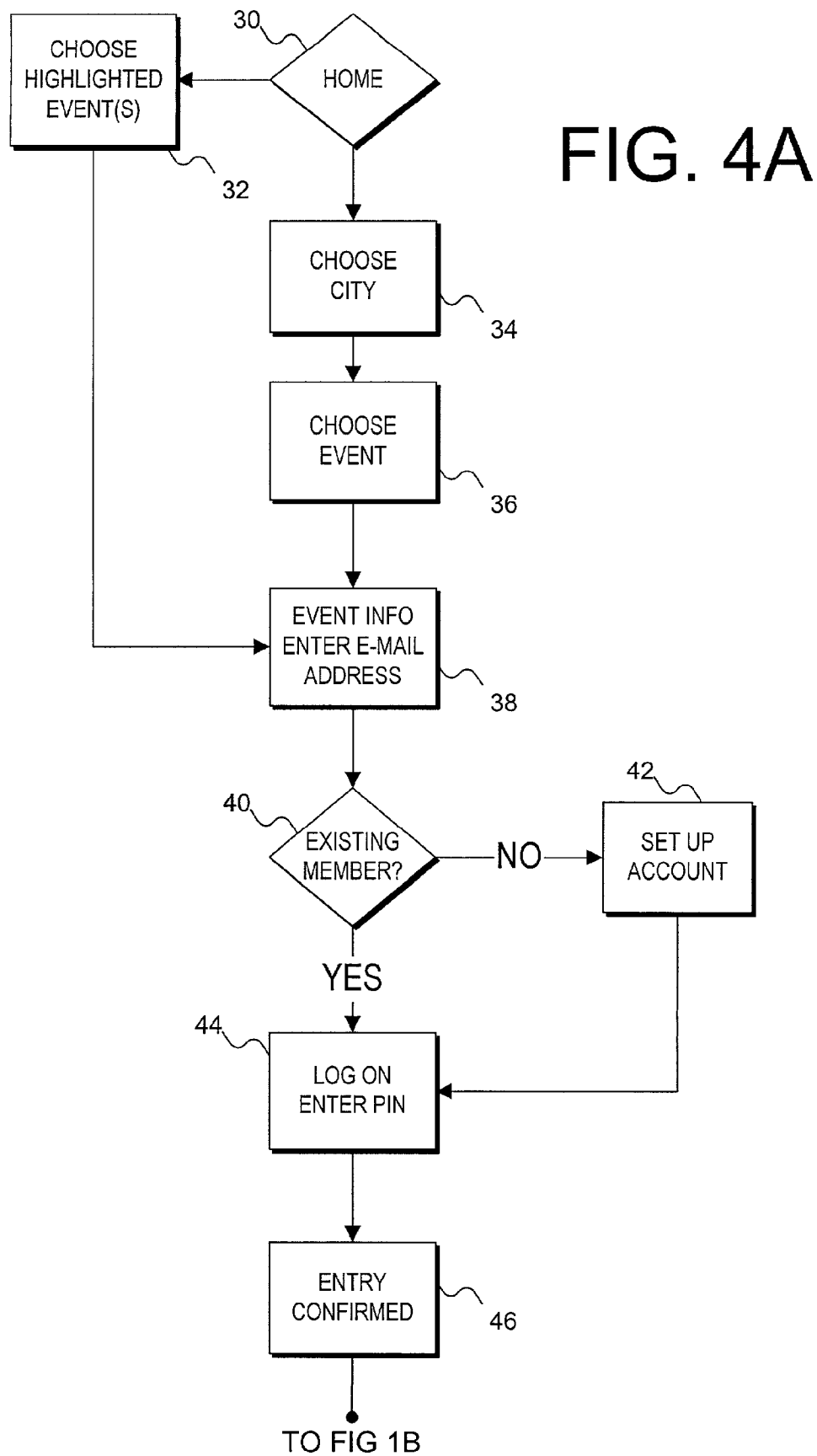
FIG. 4 is a flow diagram illustrating the operation of the user experience within a web site implementing the invention.
Figure 4B:
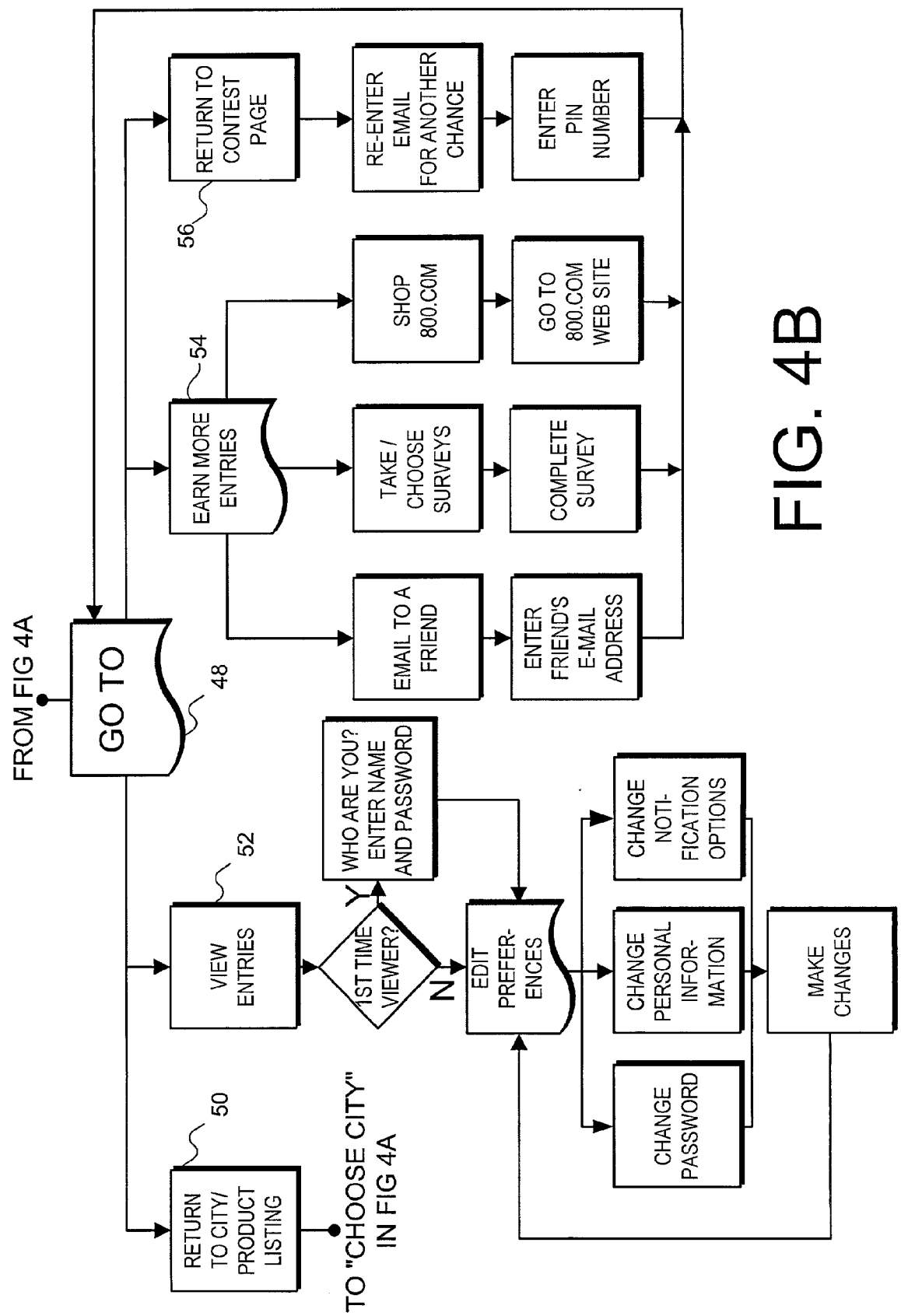

The user experience is illustrated in FIGS. 4A and 4B where the user enters contests, chooses events, sets up accounts to keep track of their entries and winnings. At home page 30, the user can either enter to win event tickets by choosing a highlighted event in block 32, or by winnowing the choices available by choosing the city in block 34 and then choosing the event in that city in block 36. Either methods will require entry of giveaway as by entering the user's e-mail address in block 38. The process then proceeds to query block 40 where it is determined whether the user is an existing member (as by consulting database of user e-mail addresses or by a cookie stored on the user's machine). If the user is not a member, then the user is requested to set up an account in block 42, including selecting a log-on name and PIN number. Once the user is registered, he or she may log in to the system in clock 44 by entering name and PIN or alternately by PIN if the user has been previously identified by cookie. Registration for the giveaway contest is confirmed in block 46 and the method proceeds to FIG. 4B.

FIG. 4B illustrates the options available to the user at the web site constructed according to the present invention. The user in block 48 may choose to conduct several different tasks, such as see what other events are available by city (block 50), view the user's existing entries (block 52), earn more entries (block 54), or return to the contest page (block 56). If the user chooses to view his or her existing entries in block 52, then the user enters name and password (if not already logged in), and edits preferences such as personal information, passwords, notification options, etc. The user can alternately choose to earn more entries in block 54 by performing one of a preselected number of tasks such as referring a friend to the service, completing user surveys for marketing data, or visiting and/or buying on partner web sites. Finally, the user can return to the contest page in block 56 to use his or her additional entries and enter more giveaway contests.

Bonus entries are accrued through taking surveys, emailing contests to a friend, etc. Anything on the site that gives the user 25, 50, 100 entries for doing something; those entries are "bonus entries." Bonus entries are applied to the last contest the user entered before taking a survey or e-mailing a friend, but can be removed from that contest and applied to any other. Bonus entries can be manipulated in any way the user wishes: add one bonus entry to every contest the user has entered, throw them all at one contest, etc. Bonus entries can also be saved in the user's account for later use. A user simply removes them from a contest by putting a zero in the bonus entry field and hitting the "move points" button. According to a preferred embodiment of the invention, any points placed into a contest that closes are lost forever, whether the user wins the contest or not.

Figure 5:
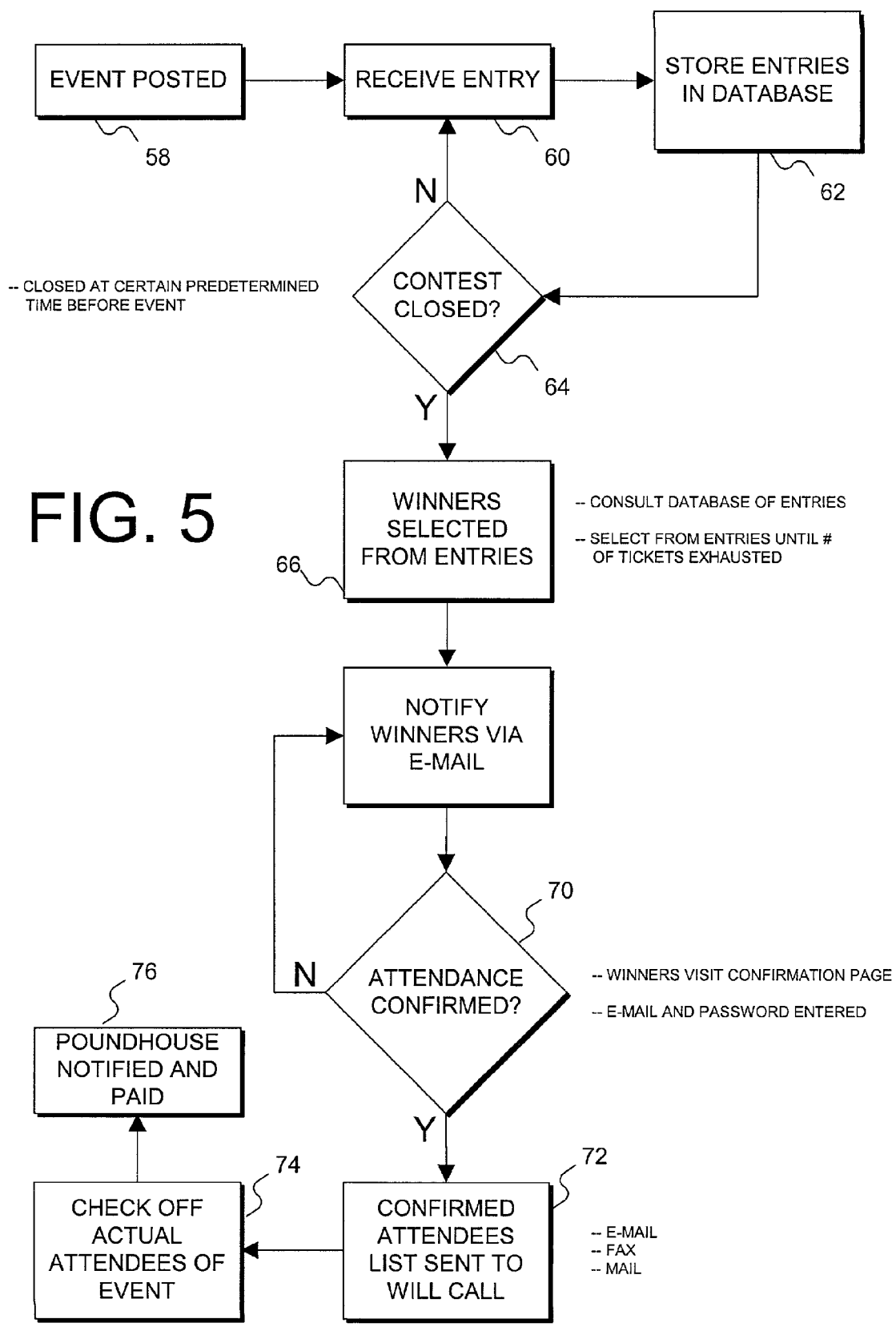
FIG. 5 is a flow diagram illustrating the method for distributing tickets according to a preferred embodiment of the invention.

FIG. 5 illustrates a preferred method for implementing the invention to post events, receive entries, and apportion the perishable entertainment inventory. An operator utilizing the present invention, such as Poundhouse, first receives content information from the event promoter. Content is placed on the web site in block 58. Content includes date of event, time of event, location of event and any other pertinent information such as the number of tickets available and the automated closing date and time of the contest. At the same time, an e-mail notice is prepared and sent to Poundhouse users in or near the specific geographical location of the event (as determined by, for instance, zip codes stored in the Poundhouse database as part of the user profiles) or to Poundhouse users that have expressed an interest in that event or similar events. The e-mail notice contains information concerning the event and how to enter for tickets to that event. A URL link will be placed in the e-mail that will take the recipient of the e-mail directly to the entry page for that event. Users are notified in the e-mail and on the web site as to how much time they have to enter the contest. The user is instructed that this is a "special event" and only has to enter once. Entries are received in block 60 and the entries stored in the database in block 62.

When the contest closes in block 64, winners are chosen from the list of entrants in block 66, depending on how many tickets we are given. In the case of Poundhouse receiving 100 tickets for an event, 50 entrants are chosen as winners; in virtually all instances, Poundhouse gives out tickets on a "you and a guest" basis. Each winner is chosen at random based on the Automation Process 28. Once all the winners have been chosen, automated emails are sent in block 68, notifying the winners that they have won, when and where the event is and how to confirm that they want to attend the event. The winner is given a URL link in the e-mail that they take to a confirmation page where they would enter their e-mail address and confirmation code. Once confirmation is completed in block 70, another e-mail is automatically sent, indicating that the user has confirmed and reminding them of the particulars of the event.

Once all the winners have confirmed or by a pre-agreed upon time, the names of the winners are compiled into a list and that list is sent to the event promoter in block 72 either by e-mail or fax. The event promoter removes the names from the list in block 74 as the winners check in to the event. The list is returned to Poundhouse shortly after the conclusion of the event. This will determine billing and payment to the service provider in block 76.

Figure 6A:
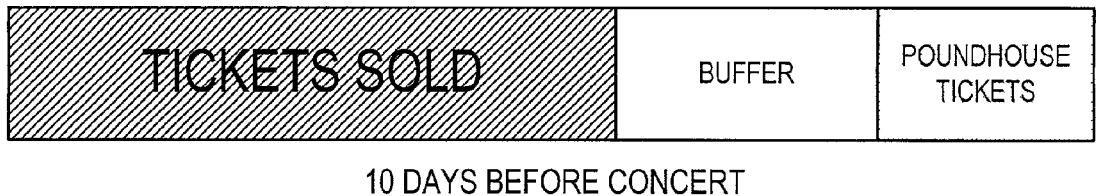
FIGS. 6A-6C is a graphical illustration showing the distribution of tickets to a concert at three different times.
Figure 6B:
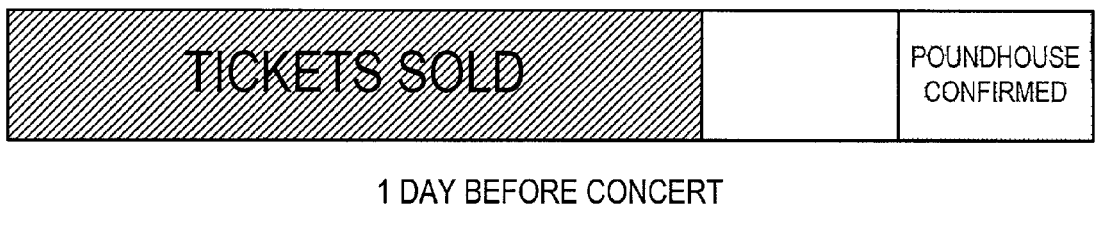
Figure 6C:
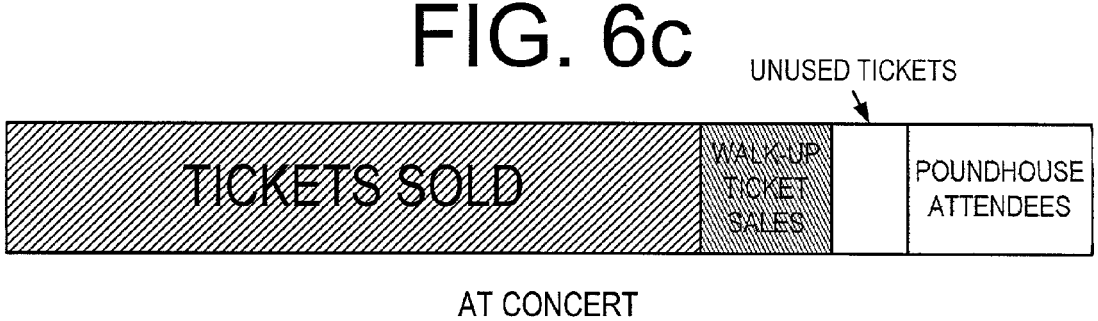

The apportionment of tickets over three time periods leading up to an event is shown in FIGS. 6A-6C whereby a promoter determines an amount of tickets to distribute according to the present invention (Poundhouse Tickets) thereby leaving a "buffer" amount of tickets to accommodate further ticket sales and walk-up ticket sales. The number of tickets contained in this buffer is selected based upon prior experience of the promoter with the particular event and/or venue. FIG. 6A shows a lead time of 10 days in which the present invention is utilized before the event—however it has been found that lead times are typically shorter thus making active narrow-casting via e-mail that much more important.

To make additional perishable entertainment inventory such as concert tickets available for giveaway according to the invention, an administrator would log in to the content server 10 and select the correct event. The administrator would click a tickets menu items and then an "add tickets" menu item within process 22. The administrator would then fill in the appropriate information, including the total number of tickets (not how many pairs are available) and double check the age requirements. The administrator then chooses an "end date" data typically at least two days in advance of the event, unless the event is to be held on a weekend or if paper tickets need to be shipped, in which case the contest needs to close earlier.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. In a computer network comprising a server node and a plurality of user nodes for users desirous of attending an entertainment event, a method for distributing perishable entertainment inventory for an entertainment event comprising:

apportioning a first number of units of perishable entertainment inventory to a database stored on the server node;

providing notice to the plurality of user nodes of the perishable entertainment inventory;

designating a deadline for winning the perishable entertainment inventory;

receiving entries from the users to win the perishable entertainment inventory at the server node up to the designated deadline, each entry corresponding to a particular user profile stored within the database;

apportioning the first number of units to a selected number of entries;

sending notice to the user nodes corresponding to addresses stored within the user profiles of the selected entries; and sending a list of the entries selected to attend an event of the perishable entertainment inventory to a promoter of the perishable entertainment inventory, said list containing at least the names of the users listed within the user profiles of the selected entries.

2. The method for distributing perishable entertainment inventory of claim 1, further comprising confirming the actual attendees at an event associated with the perishable entertainment inventory from the list of selected entries.

3. The method of claim 1, further including the steps of:
confirming the actual attendees at an event associated with the perishable entertainment inventory from the list of selected entries; and
compensating the network operator for the number of actual attendees.

4. The method of claim 1, further including the step of narrow-casting notice to the unselected entries for the perishable entertainment inventory of related inventory.

5. The method of claim 1, further including the step of narrow-casting notice to the unselected entries of the ability to purchase the perishable entertainment inventory through normal channels.

6. The method of claim 1, further including the step of awarding bonus entries.

7. The method of claim 6 wherein the step of awarding bonus entries is responsive to a user performing one from the group selected from referring a friend, visiting a partner site, and filling out a survey.

8. The method of claim 1, further including the steps of:
storing a number of entries in each user profile; and
applying the number of entries to the perishable entertainment inventory.

9. The method of claim 8, further including the step of awarding bonus entries.

10. The method of claim 9 wherein the step of awarding bonus entries is responsive to a user performing one from the group selected from referring a friend, visiting a partner site, and filling out a survey.

11. In a computer network comprising a server node and a plurality of user nodes, a method for distributing perishable entertainment inventory comprising:

apportioning a first number of units of perishable entertainment inventory to a database stored on the server node;

providing notice to the plurality of user nodes of the perishable entertainment inventory;

designating a deadline for winning the perishable entertainment inventory;

receiving entries to win the perishable entertainment inventory at the server node up to the designated deadline, each entry corresponding to a particular user profile stored within the database;

apportioning the first number of units to a selected number of entries;

sending notice to the user nodes corresponding to addresses stored within the user profiles of the selected entries; and sending a list of the selected entries to a promoter of the perishable entertainment inventory, said list containing at least the names or users listed within the user profiles of the selected entries;

storing a number of entries in each user profile;

awarding bonus entries to one user; and applying a number of entries designated by the one user to boost the one user's chances of becoming a selected entry to attend an event of the perishable entertainment inventory.

* * * * *